Aug. 5, 1958　　　　E. E. WAGNER　　　　2,845,941
PLATE VALVE FOR ROTARY UNITS
Filed Feb. 25, 1955　　　　　　　　　　2 Sheets-Sheet 1
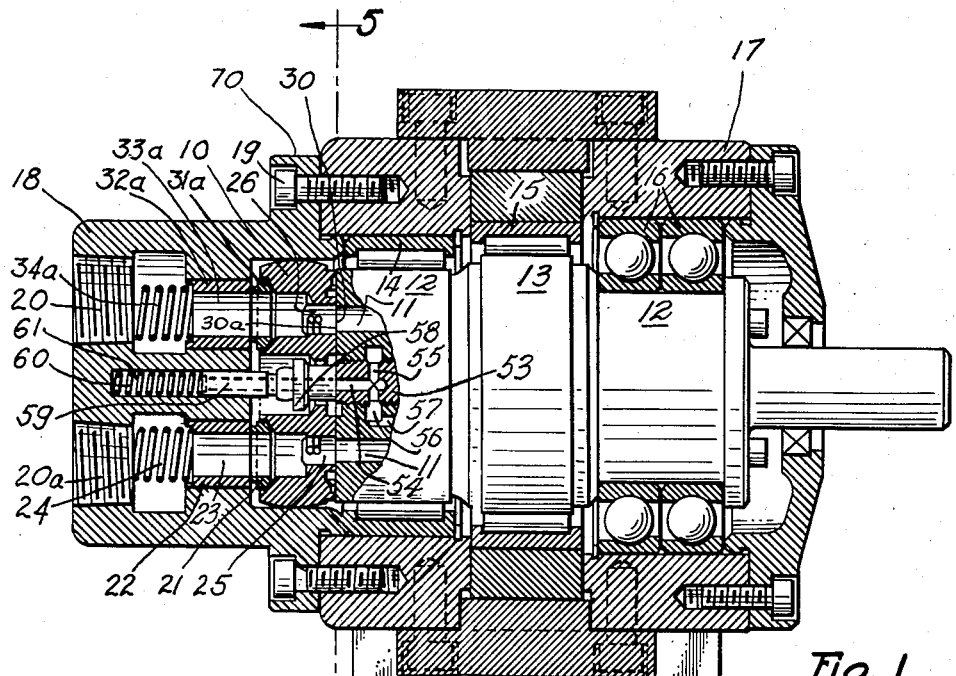
Fig. 1
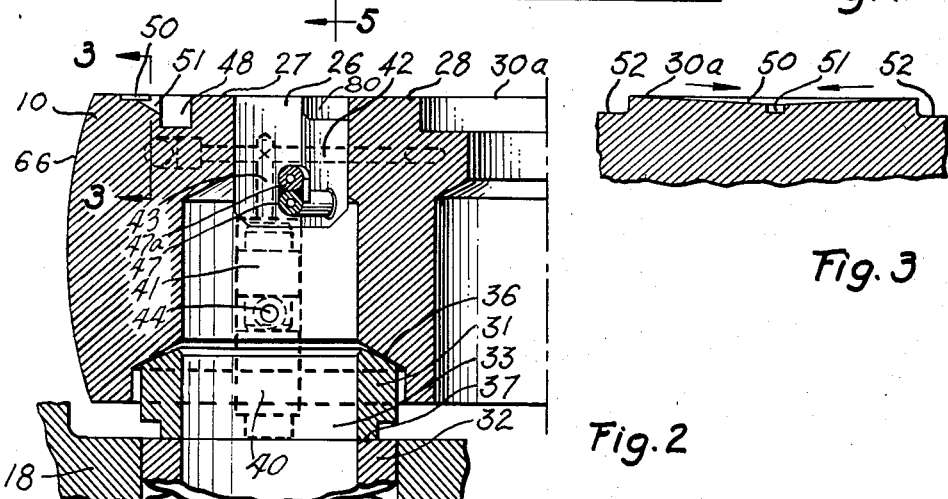
Fig. 2
Fig. 3
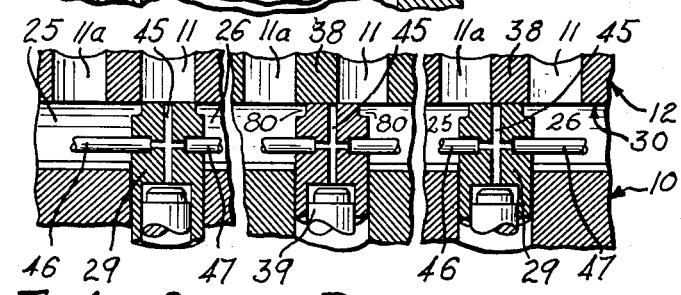
Fig. 4
INVENTOR.
E. E. Wagner

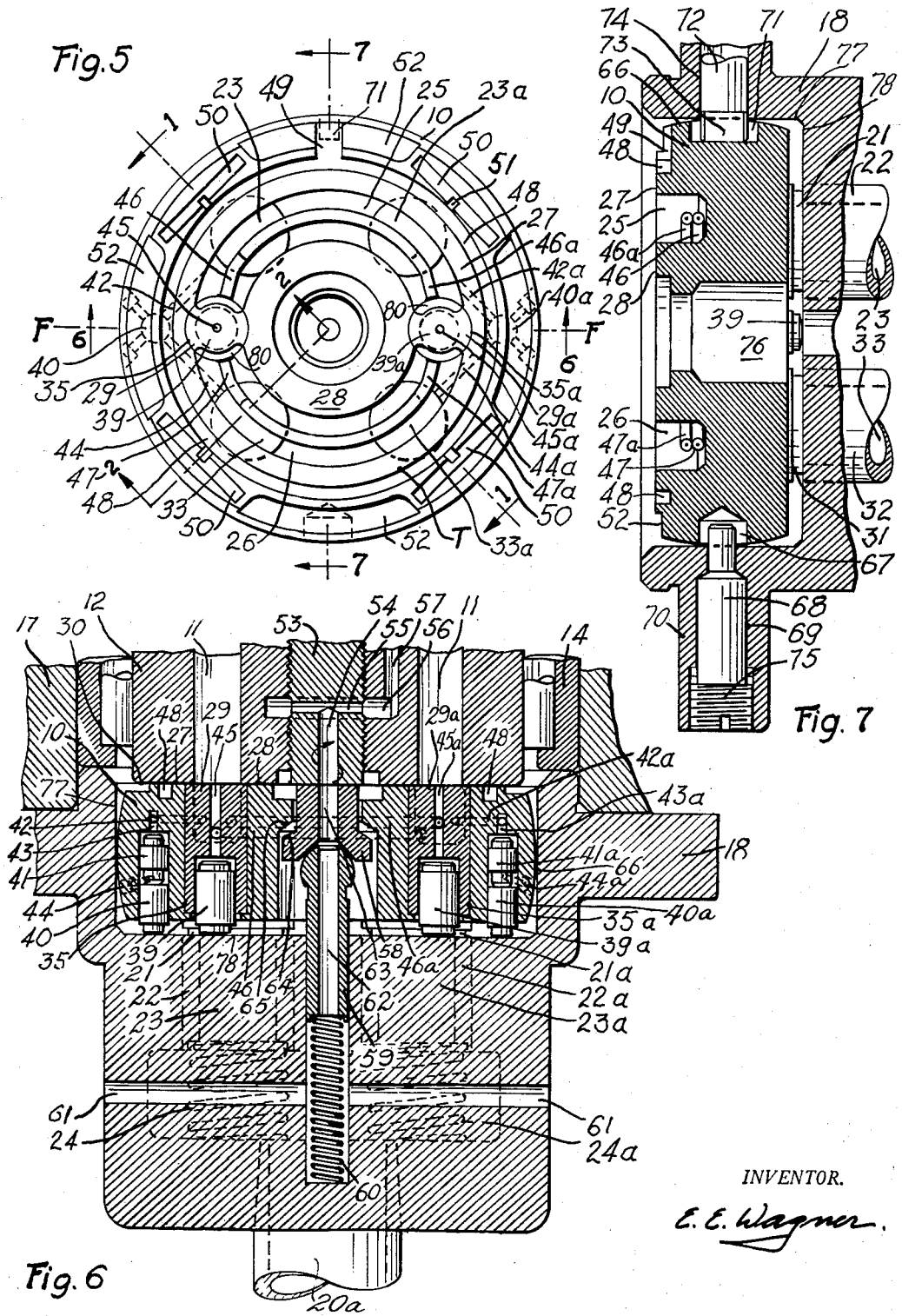

United States Patent Office 2,845,941
Patented Aug. 5, 1958

2,845,941

PLATE VALVE FOR ROTARY UNITS

Ernest E. Wagner, Santa Ana, Calif.

Application February 25, 1955, Serial No. 490,605

12 Claims. (Cl. 137—246.12)

This invention relates to a valve for rotary devices, specifically of the type of valve known as a floating plate valve or flat valve.

An object of the invention is to provide a device in which fluid leakage and friction losses are caused to approach an optimum value, whereby the efficiency of the device is considerably enhanced.

Another and essential object of the invention is to provide a plate valve by which an unbroken film of fluid may be maintained at all times between the sliding surfaces of the sealing members of a rotary unit.

Another object of the invention is to provide an arrangement of the members in which a central fluid-conducting means, independent of the plate valve, in addition to and independent of the regular inlet/outlet passageways may be incorporated in the plate valve for facilitating the introduction of fluid into the center of the rotor of a rotary unit to hold the vanes thereof projected.

Since the traverse of the inlet/outlet passageways over the bridges of the plate valve, results in an alternating imbalance of the plate valve, it is a further and important object of the invention to provide a device of the character referred to in which the imbalance may be eliminated, or so reduced to a minimum as to be negligible, and more closely offset than is possible with conventional means.

For optimum performance of a plate valve, the clearance must vary with the speed of the rotary unit, with the pressure and with the viscosity of the fluid. Therefore, the leakage must vary; in fact, the leakage, in contrast to the accepted practice of reducing leakage to an absolute minium, just short of seal failure (by reason of galling), must be considerable.

It is, therefore, a further object of this invention to provide in a floating plate valve, means, forming component parts thereof, which will operate automatically to permit the clearance to adjust for varying conditions of speed, pressure and viscosity and thereby reduce loss of energy while increasing overall efficiency of the plate valve.

Other objects and advantages will become apparent from the following description in connection with the accompanying drawings, in which:

Fig. 1 is a longitudinal, vertical section through a unit, with the section of the plate valve along line 1—1 of Fig. 5, together with its compensating means, rotated 45° relative to the housing for clarity.

Fig. 2 is an enlarged partial sectional view along line 2—2 of Fig. 5, adjacent parts being shown in fragmentary section.

Fig. 3 is a fragmentary sectional view along line 3—3 of Fig. 2 representing the long axis of one of the double wedges.

Fig. 4 is a schematic view of progressive positions of the inlet/outlet passageways over a bridge.

Fig. 5 is an enlarged transverse sectional view taken along line 5—5 of Fig. 1 with the housing omitted, showing the plate valve in its entirety.

Fig. 6 is a cross section of a plate valve taken along the line 6—6 of Fig. 5, looking in the direction of the arrow, with mating parts, in section, added.

Fig. 7 is a cross section of a plate valve taken along line 7—7 of Fig. 5, part of the housing being shown in fragmentary section.

Every type of valve employed in rotary units has individual characteristics and common to all are the losses, hereinafter referred to, owing to the inevitable clearances required between moving parts. To reduce these losses to a minimum demands close clearances and workmanship of the highest order and valves for rotary machines, therefore, must conform to the requirements of capillary seals and obey their laws.

The losses in capillary seals, between relatively movable members, embrace two definite and distinct, but interrelated factors, namely drag or losess which are due to the work of shearing the fluid film and seepage or losses due to leakage through the minute clearance spaces.

I have discovered that multiple seals, that is, seals consisting of more than one sealing surface, must have equal areas of sliding contact for equal clearances between the individual sealing surfaces, in order to achieve optimum results for a prevailing set of conditions. An equal clearance between the individual surfaces of a seal, is practically mandatory for manufacturing reasons and also because of subsequent wear in operation.

The pressure of the fluid in the clearance space between the sliding surfaces of the seal tries to separate the two, in this instance, the surface of the plate valve and the surface of it sadjacent part, i. e. the end plate of a pump. This separating force is proportional to the pressure of the fluid being sealed, therefore the operating fluid of the rotary unit may be used advantageously for holding the plate valve in balance against the separating force and in such manner that the plate valve in effect can literally float on the clearance film and adjust the film thickness to correspond to optimum performance.

This condition prevails as revealed by actual tests employing the means which are the essence of this invention, and herein described, tests which show, by evidence of the power consumed by the plate valve, that the clearances of the seal are responding to changing conditions of speed, pressure and viscosity and are approaching values which correspond to optimum performance.

Referring more particularly to the drawings, my invention comprises a rotary valve of the floating type wherein the elements constituting the valve assembly consist of a non rotating plate valve 10, which is flexibly supported and gently urged against the rotating end surface 30 of the rotor 12 of a pump or hydraulic motor by fluid operated means—later described in detail—to form a capillary seal between the adjacent sliding surfaces 30 and 30a and thereby form an efficient valve for establishing communication between the inlet-outlet passageways 11 of the rotor 12 and the inlet-outlet ports 25—26 of the plate valve 10.

The forces tending to separate the surface of the plate valve from the surface of the rotor and the forces applied to prevent that separation should be in balance; the closer the balance the more perfect and efficient the operation of the capillary seal between the two.

The separating forces mentioned can be resolved into two relatively independent groups of forces, each of which may then be independently compensated, namely: relatively constant port forces proportional to the fluid pressures (p. s. i.) in the intake-outlet ports, which port forces are offset by means such as compensating pistons in a cover 18, described later, and into rapidly fluctuating forces due to the inlet-outlet passageways 11 traversing the bridges 29—29a between the ports, which are also— i. e. in mean effect—proportional to the pressure in the ports; which bridge forces are compensated by large and small balancing pistons in the plate valve 10, cooperating in such a manner as to form a rapidly rising and falling balancing force. The bridge balancing means are also described in detail later.

The rotor 12 referred to together with the ring 13 comprises a pump and/or hydraulic motor cartridge which is carried in antifriction bearings 14—15—16 in a suitable housing 17 in a conventional manner.

Cover 18 is attached to the housing 17 of the rotary unit by means of bolts 19 and is arranged to constitute a self-contained subassembly embodying inlet/outlet connections 20—20a, and plate valve 10 in a recess 77 in said cover or housing Fig. 7. Also contained in said cover are hydraulic compensating means, consisting of aligning washers 21—21a, compensating pistons 22—22a and springs 24—24a forming twin fluid passageways 23—23a, Figs. 1—5—6—7. Said cover also houses aligning washers 31—31a, compensating pistons 32—32a and springs 34—34a forming a second set of twin fluid passageways 33—33a so that fluid entering either connection 20 or 20a is conducted over and through the springs 24—24a or 34—34a, in through the passageways 23—23a or 33—33a, in through the port 25 or 26 to the rotor passageways 11, in through the upper or lower half of the rotor and out through the oposite half, to pass on out through whichever port, twin passageway and outlet connection is not occupied by the incoming fluid.

To prevent fluid from escaping the ports 25—26 which are provided in the stationary plate valve 10 and are open on one side, Fig. 7, the lands 27—28 and the bridges 29—29a which define the ports, Figs. 5—6, seal against the rotating face 30 of the rotor 12.

The area of the land 27 must be equal to the area of the land 28. This is a prerequisite to optimum performance.

The ports 25—26 constitute a continuous annular space except for the interruption by the two bridges 29—29a. To simplify manufacturing the two ports are turned as one and the bridges 29—29a then inserted in the bores 35—35a to form the two independent ports 25—26.

The top of each inserted bridge 29—29a is relieved as shown at 80, Fig. 4B and Fig. 5, in such a manner that the shape, size and area, Fig. 5, is made substantially equal to a rotor passageway 11, Fig. 4A.

Compensating pistons 22—22a and 32—32a, each pair in a set of twin bores, are slidably arranged, which permit axial movement of the various connected parts with only minute leakage.

Aligning washers 21—21a and 31—31a have a spherical seat on one end as shown enlarged at 36 in Fig. 2 and a sliding seat 37 at the other end, which combination allows for angular and radial movement and misalignment between the plate valve and compensating pistons without breaking the fluid seal.

The function of the springs 24—24a and 34—34a is to hold the compensating pistons, aligning washers, plate valve and face of the rotor in intimate contact whenever the unit is not operating. Initial contact must be provided by the springs for starting only, consequently they need only exert a light pressure. The plate valve compensating means are self-holding as soon as pressure builds up.

In Figs. 4A, B and C the end of the rotor 12 with cylindrical passageways 11—11a is shown traversing bridge 29 separating the two ports 25—26. In Fig. 4A the bridge 29 seals off passageway 11, the two being substantially the same size, and therefore the momentary pressure over the bridge is that within the passageway 11. In Fig. 4B passageway 11 is open to 26 and as the passageway moves from 4A through 4B and beyond, less and less area over the bridge is exposed to the pressure in the port 26. In Fig. 4C the solid wall 38 between the passageways in the rotor is traversing the bridge.

The pressure between the metal wall 38 and the bridge is the average of that in ports 26 and 25 except as modified by side leakage. Furthermore, the passageway 11a following 11 communicates the pressure in port 25 to the top of the bridge. The pressure upon the bridge is therefore a continuously varying value, even though the pressure in said ports is constant.

Upon any passageway 11 traversing a bridge from a low pressure port to a high pressure port, the separating force suddenly rises, within a few thousandths of an inch movement (the overlap distance), from a minimum value to a maximum value. The position at which this action transpires is shown in Fig. 4A (passageway and bridge substantially centered). The separating force thereafter declines, proportionally to the progressive displacement of the inlet/outlet passageways, through consecutive positions, A—B—C—A in Fig. 4, until the separating force reaches a minimum value, simultaneously with the arrival of the succeeding passageway 11a in the position originally occupied by passageway 11, as shown in Fig. 4A. The cycle then repeats, but the passageway which has just entered the high pressure port continues to rotate and passes over the opposite bridge back into the low pressure port, thereupon, the separating force over a bridge first rises proportionally to displacement of said passageways, then suddenly drops. An odd number of passageways is used to smooth pulsations, therefore, the separating forces over opposed bridges are staggered in time and their sequence, as explained above, is reversed.

Peak unbalancing or separating forces occur, first over one, then over the other bridge, resulting in an oscillating or shaking force which tends alternately to raise one, then the other side of the plate valve off its seat and therefore independent balancing for each bridge is required.

The foregoing applies to the region over and immediately adjacent to the bridges and should not be confused with the far greater areas of, and separating forces due to, the ports 25—26, which forces are steady, varying proportionally to the pressures in the ports only and which are not influenced by the displacement of the passageway 11 as are the forces over the bridges. The plate valve separating forces due to the ports are balanced by separate means consisting of two sets of twin compensating pistons 22—22a and 32—32a, the action of which will be described later.

The maximum separating force over a single bridge is calculated and the balancing area required is apportioned between the small and large balancing pistons in the ratio of 1:2, which proportions represent balancing steps in increments of 33⅓%. Each inserted bridge 29—29a is provided with a bore extending axially inward from the rear face of the plate valve and operable therein are large pistons 39—39a respectively, while the plate valve is provided with smaller balancing pistons 40—40a which are disposed immediately adjacent to each bridge as shown in Fig. 6. These pistons are on a line common to the center line of the plate valve, see Fig. 5, and bear against the bottom 78 of recess 77 in the housing or cover 18.

Shuttle valves 41—41a, Fig. 6, are distinct and separate small pistons which are inserted above the small balancing pistons 40—40a in bores common to both, in order to block free flow of fluid from the port 25, via passageways 42—42a, 43—43a communicating with the inner ends of the shuttle valves, to port 26 via passageways 44—44a, communicating with the outer ends of the shuttle valves, in order to apply the discharge pressure to the small pistons 40—40a, irrespective of which port, 25 or 26, happens to be the high pressure port, while at the same time effectively preventing the fluid from blowing by.

This arrangement therefore, continuously, furnishes 33⅓% of the force required to balance whatever separating force is encountered due to the pressure in either port 25 or 26.

The insert bridges 29—29a in which the large balancing pistons 39—39a are disposed and guided have drilled passageways 45—45a extending through the center thereof, the outer ends of said passageways constituting timing ports, which cooperate with the passageways 11 in a manner subsequently explained in detail. In addition each bridge is the terminal of two capillary tubes 46—47 and 46a—47a which extend into the ports 25—26 and place each port at all times in direct fluid communication with each balancing piston 39—39a. It is well known that the pressure drop in any capillary tube is proportional to the distance along the tube, therefore the fluid pressure over the large balancing pistons—which are in the center of a pair of capillary tubes—upon closure of the passageways 45—45a by the wall 38 (Fig. 4) is equal to one-half the sum of the pressures in the two ports 25—26. The diameter and length of the capillary tubes is so proportioned that the volume of flow at the maximum operating pressure does not exceed an acceptable value.

With the passageway 45 closed, the pressure acting on a large balancing piston (assuming atmospheric pressure in the low pressure port) is equal to one-half the pressure in the high pressure port which multiplied by the area, equal to two-thirds of the total required, results in a balancing force of one-third of the maximum separating force possible. Adding this force to that of one of the small balancing pistons results in a net balancing force equal to 66⅔% of the maximum separating force.

As soon as the rotor wall 38 opens the passageway 45, either the discharge pressure or the intake pressure is applied to the top of the piston 39. The passageway 45 is many times larger in area and many times shorter than the capillary tubes so that the influence of the capillaries on the pressure over the piston can be neglected as soon as the passageway 45 opens.

If the discharge pressure is acting directly upon the large balancing piston, then the balancing force equals two-thirds of the maximum separating force. Add to this the third from the small balancing piston and 100% balance is attained.

If the suction pressure is applied which can be assumed to be zero gauge, then the balancing force becomes zero except for the 33⅓% from the small balancing piston.

Correct timing to assure that the various balancing steps are applied at the proper time and in the proper sequence is assured by properly proportioning the details. In Fig. 4A the port 25, assumed to be the suction port for this example, is just about to have its connection with passageway 11 severed. The suction pressure still prevails in port 25, passageways 11 and 45 and no balancing force of consequence is available from the large balancing piston 39. One-third of the maximum is available from the small balancing piston 40, which is more than required, for the separating force at this point is equal to zero for atmospheric pressure in the low pressure port. After a minute displacement (the overlap distance, a distance of a few .001″) the full effect of the high pressure from port 26 enters the passageways 11 and 45 of Fig. 4A and 100% balance, 33⅓% from the small piston 40 and 66⅔% from large piston 39 is available to balance the separating force, which at this point in the displacement of the passageway is also equal to the maximum or 100%.

Fig. 4B shows the relative position of the parts after a displacement of 33⅓%. The metal wall 38 of the rotor has just cut off the discharge pressure from port 26 and the pressure in the passageway 45 over the large piston 39 is now equal to half the differential pressure between the ports 26 and 25 and the force exerted is one-third of the maximum. One-third from the large piston and one-third from the small piston is equal to two-thirds of the maximum at 33⅓% displacement. This value is still ample to counterbalance the separating force which has also dropped to 66⅔%.

Fig. 4C shows the relative positions of the parts after a displacement of 66⅔%. The metal wall 38 of the rotor is just admitting pressure from the suction port 25 to the passageway 45 above the large piston. As pointed out no balancing effect need be considered from the suction pressure and the entire balancing force is supplied by the small piston, amounting to 33⅓% of the maximum. This valve is still ample to balance the separating force which at this point has also dropped to 33⅓% of its maximum.

A further displacement of 33⅓% places the parts again in the relative positions shown in Fig. 4A, which position is the end of one cycle and the beginning of the next.

The arrangement of the balancing pistons, ports and passageways, size and spacing of the rotor passageways and size of the bridges is such, that, the imbalance created by the bridges is always effectively balanced, irrespective of the direction of rotation of the rotor 12, irrespective of the operating pressure and irrespective of whether used as a pump or as a hydraulic motor.

In addition to the continuously varying forces over the bridges, a steady separating force, proportional to the fluid pressure in the ports 25 and 26, is exerted by each port against the plate valve and rotor.

Each half of the plate valve lying above and below the center line "F—F" through the bridges 29—29a, must be separately balanced, as presently descirbed, because the separating forces due to the fluid pressure in the ports 25—26 may continuously vary, each independently of the other.

The calculated area required to balance these port forces is divided between two tubular pistons 22—22a and 32—32a, one pair for the upper and one pair for the lower half of the plate valve.

Each pair of tubular pistons 22—22a and 32—32a is so disposed that the axes of the pistons are parallel to and equidistant from the axis of the plate valve 10. The resultant of the port separating forces, which are also parallel to the axes of the pistons, bisects that line common to both piston diameters, said line being parallel to the line F—F which intersects the axis of the plate valve and bisects the two bridges.

The fluid film thickness of a capillary seal varies with the pressure for optimum performance and as one-half of the plate valve will be under the influence of the suction while the other half is under the influence of the discharge pressure, the clearance of a fully balanced floating type of plate valve will attempt to satisfy the requirements of both. The film thickness decreases with increasing pressure, therefore, the high pressure half of the plate valve will have less clearance than the low pressure half and the plate valve will tilt minutely about axis F—F, forming a wedge shaped film between the face 30a of the plate valve and the face 30 of the rotor. The plate valve is stationary whereas the rotor rotates, therefore, one side of the rotor will be dragging oil out of the wedge shaped clearance, without generating pressure while the other side will be dragging oil into the wedge shaped clearance space and generate pressure in accordance with Reynold's hydrodynamic theory of lubrication. This force can become very great for small clearances and small tilt angles and will tip the plate valve about the axis 7—7 of Fig. 5 while the pump discharge pressure causes the plate valve to tilt about the axis F—F, consequently one spot on the outer edge of the plate valve will approach the face of the rotor closer than any other and, depending upon circumstances, will actually penetrate the oil film to form direct metallic contact with the rotor face, with consequent galling and destruction of the seal.

Assuming port 26 to be the discharge side of a pump with the rotor running clockwise per arrow in Fig. 6, then the point at which the oil film is likely to be first penetrated, will be at or near the point T of Fig. 5.

The danger of breaking through the oil film can be offset by purposely introducing oil wedges in the following manner:

Oil seepage across the outer land 27 of the plate valve is always present on the pressure side and unless the unit is supercharged the suction side is likely to be under a vacuum which will draw air into the unit and cause serious damage due to cavitation.

By providing an uninterrupted annular channel 48, surrounding land 27, all seepage oil from the high pressure side is collected in the channel and permitted to overflow via an opening 49 at the top of the plate valve.

As channel 48 is always full of seepage oil from the high pressure side, air is blocked from entering the channel and oil instead is fed to the suction side to effectively seal it against entry of air.

Surrounding the channel 48 outwardly, a minimum of 4 equidistant, pressure producing, wedge shaped films of fluid are created by providing elongated pockets 50 in the surface 30a of the plate valve, Figs. 2—3—5.

The bottoms of the pockets are planes inclined with respect to the face of the plate valve, Fig. 3, one end of which is flush with the surface, the opposite end pointing into the oncoming oil and sunk a few .001" below the surface, thereby forming a wedge-shaped pocket or scoop open only at the deep end.

For rotors which must reverse direction of rotation, wedges sloping in opposite directions must be provided. Placing the slopes opposed, deep ends meeting in the middle, for instance as shown in Fig. 3, is preferable to other arrangements.

Upon rotation of the rotor in either direction oil will be automatically drawn into the properly sloping wedge by hydrodynamic action. To supply the oil required each double wedge communicates with a channel 51 connecting the annular channel 48 with the central junction of the wedges, that is, with the deepest point and common entry for oil and thereby provides for an ample supply at all times and as needed.

Obviously a non reversing unit will require oil wedges sloping in one direction only.

The top surface 30a of the plate valve which mates with the surface 30 of the rotor face is a continuous unbroken surface except for the openings such as ports 25—26, the central opening 76, Fig. 7, the annular groove 48 with outlet 49 and the wedge-shaped oil pockets 50. Surfaces 52 represent material routed away to reduce drag and enhance performance.

As the clearance due to the tilting action decreases and one or the other of the oil wedges approaches the rotor closer and closer, the carrying capacity of that wedge increases many fold until, upon approaching within .0002" to .0001" the carrying capacity has multiplied a hundred fold to five hundred fold. At some safe clearance value on the order of ten thousandths of an inch the edge of the plate valve is therefore forced to heel on the oil-wedge and cannot approach any closer, instead, the force of the tilt is dissipated by causing the compensating pistons, 22—22a and 32—32a to yield against their springs 24—24a and 34—34a.

The central bolt 53 in the rotor 12 is provided with passageways 54—55 which conduct fluid via the chamber 56 and passageways 57 to a chamber, not shown, in the center of the rotor beneath the vanes, for the purpose of holding them extended. Fluid from any suitable souce is conducted to the outer end of the bolt via passageways 61 in the cover or housing 18, through the spring 60 and through the holes 62 in the pivot 59 and 63 in the socket 58.

The bolt 53 rotates while the socket 58 is stationary. The pivot 59, slidably arranged in the cover or housing 18, is provided with a spherical end which mates with the socket 58, the latter free to align itself on the end of the pivot. A spring 60 keeps the parts in initial contact until fluid pressure takes over by bearing on the inner end of the pivot, forcing the socket under hydraulic pressure, proportional to the output of the unit, against the end of the bolt 53, the parts so proportioned and positioned that the thrust of socket 58 balances the hydraulic thrust between the stationary socket 58 and the rotating bolt 53, so that the socket floats axially, self-adjusting the oil film thickness between it and the rubbing surface of the bolt to optimum clearance—corresponding to the momentary operating pressure—except as modified by the force of the necessary initial contact spring.

The tapered shoulder 64 on the socket 58 is forced into contact with the tapered shoulder 65 in the plate valve 10 by the spring 60, to firmly hold the pivot 59 and socket 58 in related position during assembly, but are not in contact nor interfere with free movement upon completing the assembly.

The peripheral surface 66 of the plate valve 10 is spherical. A hole as at 67 is drilled in the surface 66 into which a pin 68 is loosely fitted by insertion into a hole 69 in the flange 70 of the cover 18. Diametrically opposite the hole, a keyslot 71 is milled into the surface 66 and a pin 72, with its end 73 formed to cooperate with the keyslot, but shorter in length, so that the keyslot can slide a limited distance in and out, is inserted into a hole 74 in the flange 70 in which it is free to turn.

All parts of the cover or housing sub-assembly are put together and the plate valve 10 forced in against the action of the springs 24—24a and 34—34a. Pins 68, 72 can then be inserted from the outer edge of the flange 70 and retained in position by lock screws 75.

Upon releasing the plate valve, the springs will force it against the retaining pins 68, 72 thus making the assembly complete and self contained. Upon attaching the complete sub assembly to the housing 17, the plate valve assumes the position shown in Fig. 6 and Fig. 7 wherein it is radially confined but free to move axially. It is also free to tilt in any plane and wobble while restrained from rotating about its central axis, in order to preserve its timing relative to the pump and/or hydraulic motor excentricity.

I claim as my invention:

1. In combination with the end plate of a rotary unit having inlet-outlet passageways, and the housing therefor, a cover attachable to said housing and provided with a recess, a plate valve fitted in said recess and having a spherically formed periphery, the face of said plate valve provided with concentric lands having equal bearing areas and defining an uninterrupted annular port and adapted to cooperate with said end plate and the inlet-outlet passageways thereof; diametrically opposed bridges inset in said annular port to divide same and form two independent ports, compensating pistons in said cover to balance the forces in the ports tending to separate the plate valve from the face of the rotor, independent means in each inset bridge and independent means in said plate valve co-operating with said bridge means for balancing the force acting to separate the plate valve from the face of the rotor over the region of the bridges.

2. In combination with the end plate of a rotary unit having inlet-outlet passageways, and the housing therefor; a cover attachable to said housing and provided with a recess, a plate valve in said recess provided in one face thereof with concentric lands having equal bearing areas and defining an annular port; said face being adapted to cooperate with the end plate of said rotary unit and its inlet-outlet passageways; diametrically opposed bridges inset in said annular port to form two independent ports, an oil film to prevent metallic contact between said end plate and the face of said plate valve hydraulic means in said cover and plate valve cooperating to attain a balance of said plate valve and permit said oil film automatically to adjust to varying conditions of speed, pressure and viscosity of the fluid, and means in the face of said plate valve to prevent the oil film between the relatively moving surfaces from being ruptured.

3. In combination with the end plate of a rotary unit having inlet-outlet passageways, and the housing therefor, a cover attachable to said housing provided with a recess, a plate valve in said recess provided with concentric lands of equal areas defining an annular port, said plate valve being adapted to cooperate with the end plate of a rotary unit and the inlet-outlet passageways thereof; the face of said plate valve having an uninterrupted annular channel, oil pockets provided in the face of said plate valve externally of said channel, said pockets having sloping bottoms to form wedge-shaped oil films, and said channel having grooves for conveying oil to said pockets.

4. In combination with a rotary unit having inlet-outlet passageways and a central hole therein, and a cover having a recess and a central bore, a plate valve disposed in said recess provided with concentric lands defining an annular port, said plate valve being adapted to cooperate with the end plate of said rotary unit and with the inlet-outlet passageways thereof, said plate valve having a central opening, a tubular member in said opening and freely associated therewith, a spring loaded hollow pin slidably disposed in the bore of said cover, and provided with a pivot to engage said tubular member and hold same in place, said tubular member being adapted to form a capillary seal with that face of said rotary unit surrounding the central hole in said rotor and automatically align itself on said pivot, and said central bore being adapted to conduct fluid through said pivot and tubular member to the central hole in the rotary unit.

5. In a rotary unit, the combination with the end plate thereof having inlet-outlet passageways, and a housing: of a cover adapted for connection to the housing of said rotary unit and provided with a recess, a valve comprising a disk fitted in said recess, means to hold said disk associated with said cover while permitting limited movement thereof, the face of said plate valve provided with concentric lands having equal bearing areas and defining an uninterrupted annular port and adapted to cooperate with the end plate of said rotary unit and the inlet-outlet passageways thereof, diametrically opposed removable bridges inset in said annular port to divide same and form two independent ports, the area of said inset bridges in contact with the face of the rotor of said rotary unit being substantially equal to the areas of said inlet-outlet passageways thereof, pistons in said bridges and independent means in said disk cooperating with said pistons automatically to balance the separating forces over the bridges.

6. In combination with the rotor of a rotary unit having inlet-outlet passageways, and the housing therefor, a cover attachable to said housing provided with a recess, said cover having fluid inlet-outlet connections, a nonrotatable, axially movable plate valve in the recess of said cover having in the face thereof an annular port and oppositely disposed bridges dividing said port into two ports, the area of contact of each of said bridges being substantially equal to a passageway in said rotor; a pair of hollow twin compensating pistons slidable in said housing and bearing against said plate valve; said compensating pistons forming a pair of twin fluid passageways for conducting fluid therethrough to the ports in said plate valve; a pair of small balancing pistons operably disposed in said plate valve and resting on the rear wall of said recess, valves in the bores with said small balancing pistons, passageways connecting said bores with the ports in said plate valve, said valves being adapted to block free flow of fluid from said ports; capillary tubes of equal length in the ports of said plate valve; larger balancing pistons in said bridges, said bridges forming terminals for one end of each of said capillary tubes and placing each port in said plate valve at all times in direct fluid communication with said larger balancing pistons, both said small and larger pistons combining to effect substantially a balance of the bridge separating forces.

7. In combination with a rotary unit, a housing having a recess, a nonrotatable member axially movable in said recess, said member having lands in the face thereof defining an annular port, and opposed insertable bridges dividing same into two ports, the lands and bridges being adapted to seal against the rotating face of said rotary unit, said bridges having central passageways and cylinders, balancing pistons in said cylinders bearing against the bottom of said recess, capillary tubes in said ports and in direct fluid communication with the balancing pistons; said member having a bore adjacent to each of said bridges, pistons in said bores bearing on the bottom of said recess, said bridge pistons forming sets with said adjacent pistons, shuttle valves in said bores, passageways communicating with the inner ends of said valves and one of said ports, and passageways communicating with the outer ends of said shuttle valves and the other port, both pistons in one of said sets cooperating to effect a stepwise balance, proportional to the separating force over its associated bridge.

8. In combination with the end plate of a rotary unit having inlet-outlet passageways, and the housing therefor; a cover adapted for connection to the housing of said rotary unit and having a recess, a plate valve fitted in said recess and having a spherically formed periphery to enable same to tilt and wabble, the face of said plate valve provided with concentric lands having equal bearing areas and defining an annular port, said lands being adapted to bear against the end plate of said rotary unit to form capillary seals, diametrically opposed bridges removably inset in said annular port to interrupt the continuity thereof and form two inlet-outlet ports for communication with the inlet-outlet passageways in said end plate, means in said cover to balance the hydraulic forces in said ports tending to separate the plate valve from said end plate and constituting fluid passageways, and a plurality of fluid pressure means in said inset bridges and said plate valve co-operating to effect substantially a balance of the bridge separating forces.

9. In combination with a rotary unit and the rotor thereof having inlet-outlet passageways, a cover provided with a recess, a valve in said recess having a spherical periphery, said valve comprising a disk axially movable and restrained from radial and rotative movement relative to said recess, the face of said valve having lands of equal areas defining an annular port adapted to cooperate with said rotor and the passageways thereof, diametrically opposed bridges removably inset in and dividing said port into two ports, means controlled by the pressure of the operating fluid to hold the valve in balance with the separating forces due to the pressure in said ports on the sealing fluid, means to offset the imbalance of said valve over said bridges due to the traverse of the inlet-outlet passageways of the rotor across said bridges, said means comprising pistons in each bridge and independent means in the valve, comprising pistons and shuttle valves co-operating with the pistons in said bridges in predetermined proportions to balance the separating force over the area of the bridges due to the pressure in said passageways of the rotor, thereby enabling the valve to float on the clearance film and automatically adjust the film thickness.

10. A plate valve of the character referred to for a rotary unit including a cover having a recess therein and provided with a central bore, a disk fitted in said recess having a spherical periphery, means to hold said disk associated with said cover and permit limited movement thereof, said disk having a central opening therethrough, said opening provided with an inner shoulder, a tubular member extending therethrough and diametrically smaller than the diameter of said inner shoulder and provided with a shoulder adapted to abut the shoulder in said opening, a hollow pin in the bore of said cover, a spring to force and hold the end of said pin in contact with said tubular member to insure association thereof with said disk; the face of said disk having concentric lands with equal areas defining an uninterrupted annular port, said said disk having diametrically opposed bores athwart of said port, bridges in said bores to form two independent ports of said annular port, the face of said bridges conforming substantially to the shape and area of a rotor passageway and each bridge having a cylinder extending axially inward from the rear face of said disk and a central passageway communicating with said cylinders and terminating at the face of said bridges, pistons in said cylinders bearing against the bottom of said recess, means in said ports forming connections communicating with the passageways in said bridges, diametrically opposed smaller cylinders adjacent to and in line with said bridge cylinders, shuttle valves in said smaller cylinders, and smaller pistons in said cylinders co-operating with said shuttle valves and bearing against the bottom of said recess, passageways connecting one end of each shuttle valve with one of said ports, and passageways connecting the other end of each shuttle valve with the other port.

11. A plate valve of the character referred to for a rotary unit including a cover, and provided with a central bore, a disk fitted in said cover having a spherical periphery, means to hold said disk associated with said cover and permit limited movement thereof, said disk having a central opening therethrough provided with an inner shoulder, a tubular member extending therethrough and diametrically smaller than the diameter of said inner shoulder and provided with a shoulder adapted to abut the shoulder in said opening, a hollow pin in the bore of said cover, a spring to force and hold the end of said pin in contact with said tubular member to insure association thereof with said disk; the face of said disk having concentric lands with equal areas defining an uninterrupted annular port, said disk having diametrally opposed bores athwart of said port, bridges in said bores to form two independent ports of said annular port, each of said bridges having a cylinder extending axially inward from the rear face of said disk, and a central passageway communicating with said cylinders and terminating at the face of said bridges, pistons in said cylinders bearing against said cover, means placing said ports in fluid communication with the pistons in said bridges, diametrally opposed smaller cylinders in said disk adjacent to and in line with said bridge cylinders, shuttle valves in said smaller cylinders, and smaller pistons in said cylinders co-operating with said shuttle valves and bearing against said cover, passageways connecting one end of each shuttle valve with one of said ports and passageways connecting the other ends of each shuttle valve with the other port.

12. A plate valve of the character and for the purpose referred to, comprising a disk having a spherical periphery, a cover having a recess in which said disk is fitted, the face of said disk having an annular port, and diametral bores athwart of said port, bridges in said bores to form two independent ports of said annular port, each of said bridges having a piston therein and provided with a central passageway terminating at the face thereof, said pistons bearing against the bottom of said recess, smaller pistons diametrally opposed in said disk, shuttle valves in said disk co-operating with said smaller pistons, passageways connecting one end of each shuttle valve with one of said ports, and passageways connecting the other end of each shuttle valve with the other port, both said bridge pistons and disk pistons co-operating to balance the separating forces over said bridges.

References Cited in the file of this patent

UNITED STATES PATENTS

| 951,278 | Janney | Mar. 8, 1910 |
| 2,288,768 | Zimmermann | July 7, 1942 |
| 2,449,297 | Hoffer | Sept. 14, 1948 |
| 2,577,242 | Grad | Dec. 4, 1951 |
| 2,608,158 | Beaman | Aug. 26, 1952 |
| 2,608,933 | Ferris | Sept. 2, 1952 |
| 2,633,104 | Lauck | Mar. 31, 1953 |

FOREIGN PATENTS

| 402,502 | Great Britain | Dec. 7, 1933 |